May 9, 1950 R. A. McLAUGHLIN 2,507,448
BLANK GAUGE FOR SHEARING MACHINES
Filed June 7, 1948 2 Sheets-Sheet 1
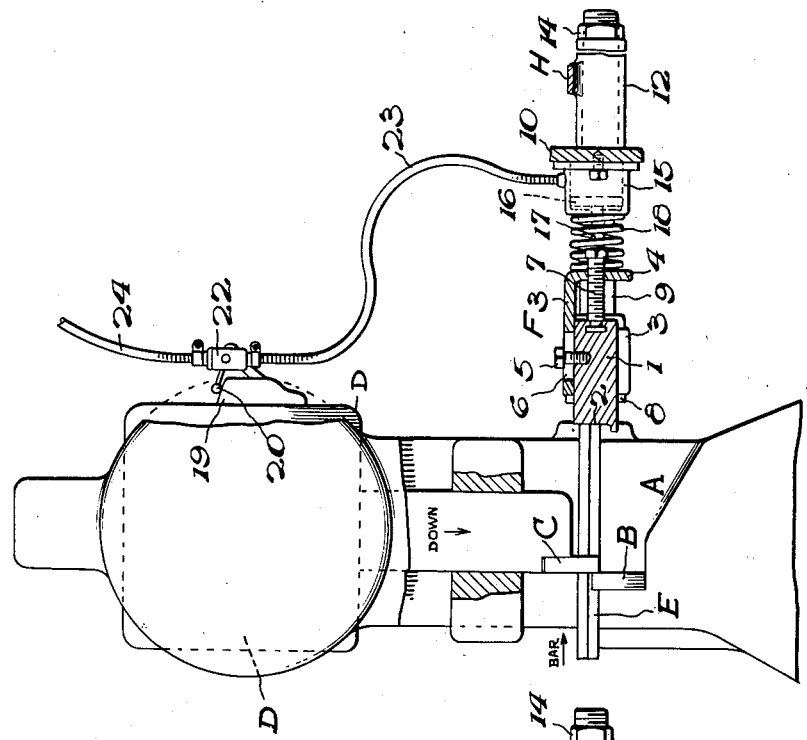
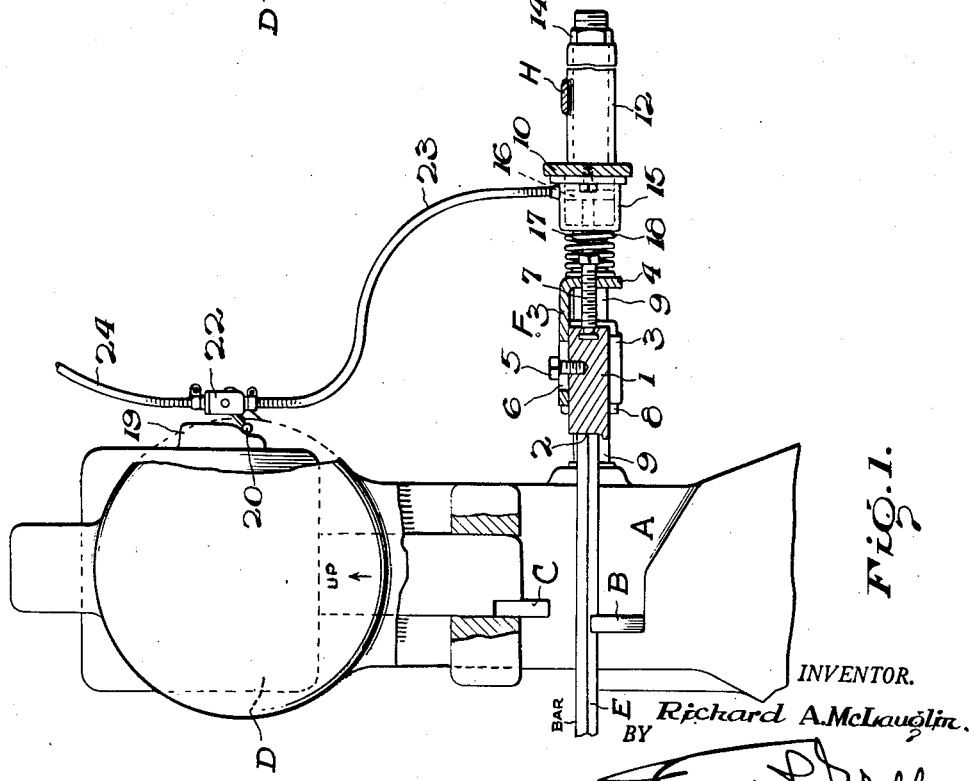
INVENTOR.
Richard A. McLaughlin
BY
Attorney May 9, 1950  R. A. McLAUGHLIN  2,507,448
BLANK GAUGE FOR SHEARING MACHINES
Filed June 7, 1948  2 Sheets-Sheet 2
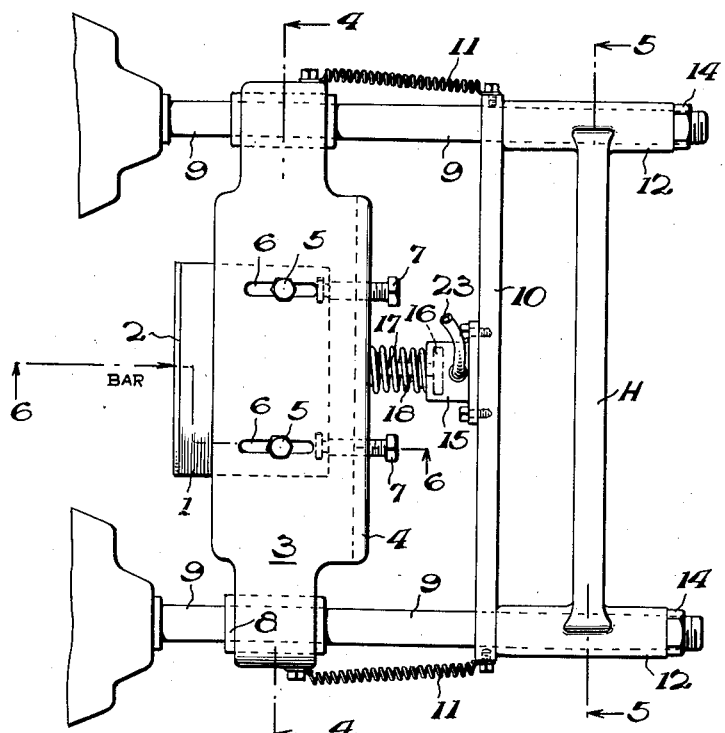
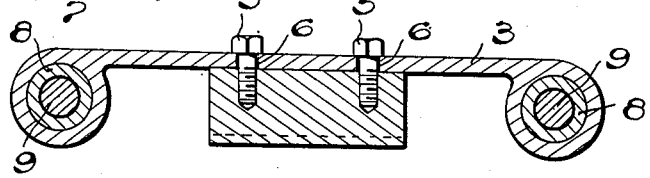
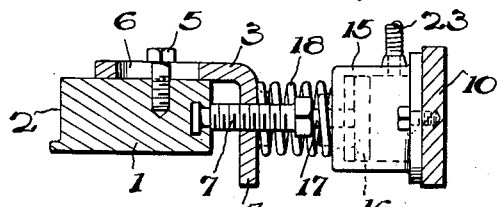
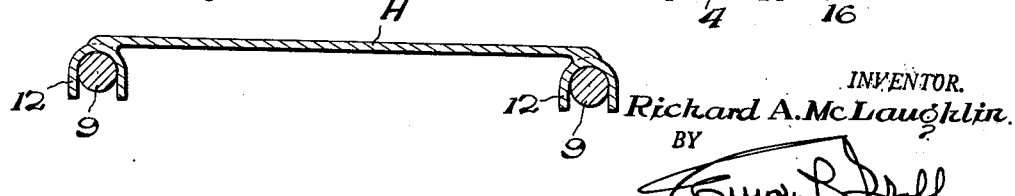
INVENTOR.
Richard A. McLaughlin
BY
Attorney Patented May 9, 1950

2,507,448

UNITED STATES PATENT OFFICE 2,507,448

BLANK GAUGE FOR SHEARING MACHINES

Richard A. McLaughlin, Canton, Ohio, assignor to Poor & Company, Chicago, Ill., a corporation of Delaware Application June 7, 1948, Serial No. 31,430

8 Claims. (Cl. 164—59)

This invention relates to shearing machines of the type for cutting bar stock into blanks, and more particularly to a novel gauge assembly for insuring cutting the blanks into sections of preselected, uniform length.

A general object of the invention is to provide a blank length gauge assembly which permits the workman feeding the bar stock to push the same between the shear blades until the leading end strikes a yieldable gauge element, and then, before the shear blades effect cutting, automatically push the bar stock back so that the distance between the leading end of the bar stock and the point of shear will always be uniform, thus substantially eliminating the cutting of oversized blanks. Therefore, in its primary aspect, the present invention represents a carrying forward of the invention shown and described in the application of Philip W. Moore, Jr., Serial No. 699,326, filed September 25, 1946.

More specifically, the present invention has for its object a blank gauge assembly including a gauge element or block which yields under impact when struck or engaged by the leading end of the bar stock being fed in by the operator, and then as the ram descends to bring the movable blade into cutting position, the yieldingly mounted gauge element is moved by fluid means controlled by the ram to push the over-fed bar stock back to correct blank size.

Another object of the invention is to provide a gauge assembly wherein the gauge block is connected to a relatively fixed abutment bar or its equivalent by tension springs and a fluid operated piston and cylinder arrangement is interposed between the bar and gauge element or its carrier to move the said element toward the shear blades as the ram descends; spring cushioning means also being provided between the gauge element and said abutment bar to permit the gauge block to yield when struck by the leading end of the bar stock while the shear blades are open. In that connection, it will be understood that the fluid operated means for pushing the gauge block toward the shear blades is automatically synchronized with the movement of the ram carrying the movable shear blades.

A further object of the invention is to provide a gauge assembly including a frame on which the gauge block and the abutment bar aforesaid are mounted, the said frame also being intended to accommodate a removable and replaceable gauge unit of predetermined length for the purpose of readily adapting the gauge assembly to be useful in cutting blanks of greater or less overall length while at the same time preserving the automatic self-adjusting feature of the gauge block proper, which is engaged by the bar stock.

With the above and other objects in view, which will more readily appear as the nature of the invention is better understood, the same consists in the novel construction, combination and arrangement of parts, hereinafter more fully described, illustrated and claimed.

A preferred and practical embodiment of the invention is illustrated in the accompanying drawings in which:

Figure 1 is a vertical cross sectional view of a ram type shear, partly in section, and showing the present improvements in vertical section, the ram being at the upper end of its stroke.

Figure 2 is a view similar to Figure 1 showing the relative position of parts when the ram is at the end of its shearing stroke.

Figure 3 is an enlarged detail top plan view of the gauge assembly.

Figure 4 is a vertical cross sectional view taken on the line 4—4 of Figure 3.

Figure 5 is a vertical cross sectional view taken on the line 5—5 of Figure 3.

Figure 6 is a detail longitudinal sectional view of the gauge block and its carrier, together with the associated cushion, spring and fluid cylinder.

Similar references designate corresponding parts throughout the several figures of the drawings.

Referring to Figures 1 and 2, it will be seen that a conventional type of reciprocating shear is illustrated, the same including the bed or base A having a fixed blade B and a movable blade C carried by the reciprocating ram designated generally as D. The bar stock E to be cut is manually advanced, when the ram is elevated, between the shear blades B and C toward the present gauge assembly designated generally as F.

The gauge assembly F is mounted at the rear of the base of the shearing machine with the stock abutting element or gauge block 1 disposed substantially in the line or plane of horizontal feed of the stock E. The gauge block 1 is arranged to have its face 2 engaged by the leading end of the bar stock E as the workman feeds the shear. This block is mounted on a cross head 3 of any appropriate form, but, preferably as illustrated, the said cross head is provided with a downturned wall 4. As will be observed from the drawings, the gauge block 1 is held to the underside of the cross head by bolts 5 adjustable in the slots 6. The wall 4 is provided with threaded adjustment bolts 7 whose inner ends are formed with collars for insertion in a keyway at the side of the block opposite the face 2. Thus, by loosening the bolts 5 and turning the bolts 7, the gauge block 1 may be adjusted transversely of the cross head within relatively small limits, for example, an inch or fractions of an inch. In other words, the face 2 of the gauge block 1 may be moved closer or farther from the line of shear by proper adjustment of the bolts 7, and thereafter the bolts 5 may be tightened to lock the block rigidly in set position.

In the example shown, the cross head 3 is provided at opposite ends thereof with the bushings 8 or their equivalent which slide on the spaced rods 9 which, in effect, provide a supporting frame projecting rearwardly from the bed of the machine substantially at the level of stock feed. Moreover, the cross head 3 is connected to an abutment bar 10 by tension springs 11 whose opposite ends are connected respectively to the bushings 8 and the ends of the bar 10. This bar is also mounted on the rods 9 and may be moved thereon, but normally the said bar occupies a relatively fixed position on the rods 9 since it is backed up by the front ends of the yoke portions 12 of a removable and replaceable interchangeable length master gauge unit H. That is to say, the inverted U-shaped yoke portions 12 are connected by a strip or strap 13 so that they may be moved as a unit radially to straddle or embrace the outer end portions of the rods 9. As will be seen from Figure 3, the yoke portions 12 are disposed between the rear face of the abutment bar 10 and nuts 14 secured on the threaded ends of the rods 9. By using a length gauge H having longer or shorter yoke portions 12, it will be seen that the spring connected cross head 3 and abutment bar 10 may be bodily moved a greater or less distance from the line of shear thereby to make blanks of different length.

The use of the master gauge unit H permits of making major adjustments for gross blank length while the bolts 7 which adjust the gauge block 1 take care of minor or fractional adjustments necessary to secure exact or net blank length.

Referring further to the cross head 3 and the abutment bar 10 connected by the tension springs 11, it will be understood that the purpose of said springs 11 is to draw the cross head and bar toward each other, or to put it another way, retract the block 1 toward the bar 10.

In Figure 3 the bar 10 supports a fluid cylinder 15, having therein a piston 16 whose stem 17 is preferably carried by the wall 4 of the cross head 3. A cushioning or shock absorbing spring 18 is confined between the wall 4 of the cross head and the related face of the head of the cylinder 15. The spring 18 is preferably stronger than the combined effect of the springs 11 so as to normally tend to push the cross head 3 and gauge block 1 away from the abutment bar 10 when the piston 16 is not subjected to pressure within the cylinder 15, thereby to enable the convolutions of the spring 18 to be spread apart and to be ready to be compressed. Thus, when the shear blades are open and the workman feeds the bar stock into the machine, the leading end of the bar stock strikes the face 2 of the gauge block 1 and pushes the block and its cross head rearwardly against the cushioning force of the spring 18. By this arrangement, the workman feeding the bar stock has the sensation of the impact of the leading end of the bar stock being absorbed by the said spring 18.

When the workman feeds the bar stock to the point where it engages the face 2 of the gauge block 1 and compresses the spring 18, the ram D begins its descent, as shown for example in Figure 1. As the ram continues to descend as shown in Figure 2, a cam 19 on the ram actuates the handle or operator 20 of a two-way valve 22 supported at a convenient location adjacent the ram. When the ram descends to move the blades B and C into cutting position, as shown in Figure 2, at an appropriate point in its stroke, compressed air is supplied through the conduit 23—24 to the cylinder 15 behind the piston 16 which advances the cross head 3 and gauge block 1 toward the line of shear, for example, approximately one-half inch, thereby pushing the bar stock toward the shear blades to obtain the predetermined blank length.

As the ram descends back to the position shown in Figure 1, the cam 19 actuates the operator 20 so as to close the compressed air line 24 and open the line 23 to the atmosphere, thereby permitting springs 11 to retract the cross head 3 back to normal position and cause the gauge block 1 to retreat from the line of shear.

From the foregoing it will be understood that the gauge block and its supporting parts are cushioned against impact of the leading end of the bar stock, but just prior to the blades B and C effecting cutting, the piston and cylinder arrangement 15—16 moves the block 1 forward to push the stock back to insure uniform net blank gauge length.

I claim:

1. A blank length gauge for shearing machines having fixed and movable shear blades, a ram for the movable blade, a blank gauge assembly at the side of the blades opposite to that where the stock is fed in, comprising, a pair of spring-tensioned members, one of which carries a stock engaging gauge-element and is slidable relative to the other which remains stationary, a cushioning spring between said members to absorb the impact of the bar stock engaging the gauge element when the stock is manually fed thereagainst, and means controlled by the descent of the ram for moving the member carrying the gauge-element toward the said blades prior to cutting to provide a blank of predetermined length.

2. A blank length gauge for shearing machines having fixed and movable shear blades, a ram for the movable blade, a blank gauge assembly at the side of the blades opposite to that where the stock is fed in, comprising, a pair of spring tensioned members one of which carries a bar stock engaging gauge-element and is slidable relative to the other which is stationary, a spring between said members to absorb impact on the gauge-element when the stock is manually fed thereagainst, fluid pressure means including a piston and cylinder between said members, and valve means controlled by the ram to supply fluid pressure to said cylinder to move the slidable member toward the cutting blades and to exhaust said cylinder to the atmosphere.

3. A blank length gauge for shearing machines having fixed and movable shear blades, a ram for the movable blade, a blank gauge assembly at the side of the blades opposite to that where the stock is fed in, comprising, a frame, a pair of spring-tensioned members mounted on the frame, one of said members carrying a bar stock engaging gauge-element and slidable relative to the other member which is relatively stationary on the frame, a spring between said members to cushion impact on the stock engaging gauge-element when the stock is manually fed thereagainst, means synchronized with the movement of the ram to cause the gauge element to advance and retreat relative to the line of shear, and a gauge unit of fixed length adapted to be applied to the frame to back up said stationary member.

4. In a blank shearing machine, the combination with shear blades, of a frame carried by the machine at the side opposite to that where the stock is fed in, yieldable gauge-element means on the frame, means synchronized with the shear blades and interconnected with said gauge-element means to cause the same to advance and retreat relative to said blades, and a master blank length gauge unit of fixed length on said frame for cooperation with said gauge-element means to determine the gross length.

5. In a blank shearing machine, the combination with shear blades, of a frame carried by the machine at the side opposite to that where the stock is fed in, yieldable gauge-element means on the frame, fluid operated piston and cylinder means for causing said gauge-element to advance and retreat relative to the line of shear, and a master blank length gauge unit on said frame for cooperation with gauge-element means to determine the gross length.

6. In a shearing machine having a fixed blade and a movable blade, a ram carrying the movable blade, a frame at the side of the machine opposite to that where the stock is fed in, a stock blank gauge assembly mounted on the frame and comprising, a cross head slidably mounted the frame, a gauge block carried by the cross head, an abutment bar mounted on the frame, tension springs connecting the cross head and abutment bar, a fluid cylinder mounted on the bar, a piston in the cylinder and having a stem connected to the cross head, a spring surrounding the stem of the piston and confined between the cross head and the head of the cylinder whereby when the leading end of the bar stock strikes the gauge block, said spring will yield, means on the frame for backing up the abutment bar, a fluid conduit communicating with a source of fluid under pressure and also communicating with the cylinder at one side of the face of the piston, a two-way valve in said conduit, an operator for said valve, and means on the ram adapted to engage said operator when the ram is elevated to turn the valve to cut off the fluid pressure supplied to the cylinder and open the same to the atmosphere, and, when the ram descends to move the operator to supply fluid pressure to the cylinder to actuate the piston against said tension springs and move the cross head and gauge block in a direction to push the bar stock back to predetermined blank length determined by the distance between the stock engaging face of the gauge block and the line of shear.

7. In a shearing machine including fixed and movable blades and a ram for actuating the movable blade, a gauge to determine the length of the stock cut, means operable in response to retraction of said ram and the movable blade to move said gauge in the direction of stock feed to permit overfeeding of the stock, and a fluid-operable power unit operable in response to projection of said ram to move said gauge in a direction counter to the direction of stock feed to predetermine the length of the stock cut.

8. In a shearing machine including fixed and movable blades and a ram for actuating the movable blade, a gauge to determine the length of the stock cut, means operable in response to retraction of said ram and the movable blade to move said gauge in the direction of stock feed to permit overfeeding of the stock, a fluid-operable power unit to move said gauge and the stock in a direction counter to the direction of stock feed to predetermine the length of the stock cut, and valve means operable by projection of said ram to admit fluid to said power unit.

RICHARD A. McLAUGHLIN.

REFERENCES CITED

The following references are of record in the file of this patent:

UNITED STATES PATENTS

| Number | Name | Date |
|---|---|---|
| 1,141,644 | McDonald | June 1, 1915 |